United States Patent [19]
Woodall et al.

[11] Patent Number: 5,182,956
[45] Date of Patent: Feb. 2, 1993

[54] PROTECTIVE BOOT

[76] Inventors: Bobbie L. Woodall, 2513 S. Mollera, Mesa, Ariz. 85202; Charles R. Nichols; Thelma E. Nichols, both of P.O. Box 1121, St. Johns, Ariz. 85936

[21] Appl. No.: 738,795

[22] Filed: Jul. 31, 1991

Related U.S. Application Data

[63] Continuation of Ser. No. 414,774, Sep. 25, 1989.

[51] Int. Cl.$^5$ .............................................. F16J 15/50
[52] U.S. Cl. ................................ 74/18.2; 277/212 FB
[58] Field of Search ............................... 74/18.2, 18.1; 277/212 FB

[56] References Cited

U.S. PATENT DOCUMENTS

| | | | |
|---|---|---|---|
| 1,137,598 | 4/1915 | Flentje | 74/182 X |
| 2,106,592 | 1/1938 | Dick | 74/18.2 X |
| 4,114,460 | 9/1978 | Oto | 74/18.2 |
| 4,154,434 | 5/1979 | Wallis | 74/18.2 X |
| 4,813,913 | 3/1989 | Belter | 277/212 FB X |

FOREIGN PATENT DOCUMENTS

| | | | |
|---|---|---|---|
| 574262 | 4/1933 | Fed. Rep. of Germany | 74/18.2 |
| 706519 | 5/1941 | Fed. Rep. of Germany | 74/18.2 |
| 1587400 | 12/1978 | United Kingdom | 277/212 FB |

*Primary Examiner*—Allan D. Herrmann
*Assistant Examiner*—David W. Laub
*Attorney, Agent, or Firm*—Don J. Flickinger; Jordan M. Meschkow; Robert A. Parsons

[57] ABSTRACT

A protective boot for preventing contamination of the oil in a hydraulic piston-cylinder assembly consists of an elongate flexible sleeve having a first end removably securable to the head of the cylinder and a second end removably securable to the distal end of the piston rod. The boot is split along a longitudinal seam which can be closed by a zipper, a hook and loop type fastening strip, or other suitable attachment devices. Several flexible metal or plastic stays encircle the sleeve at spaced locations to prevent the sleeve from contacting the piston rod. Each stay is split to accommodate the seam.

14 Claims, 1 Drawing Sheet

U.S. Patent    Feb. 2, 1993    5,182,956
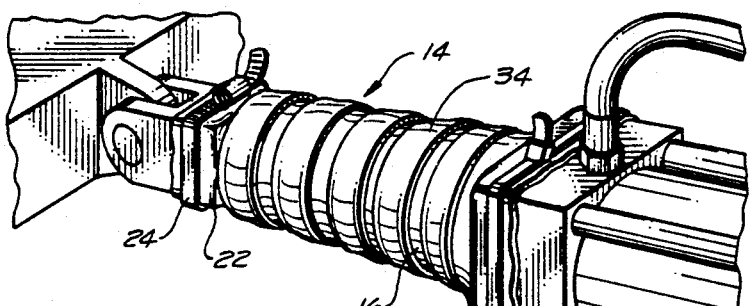
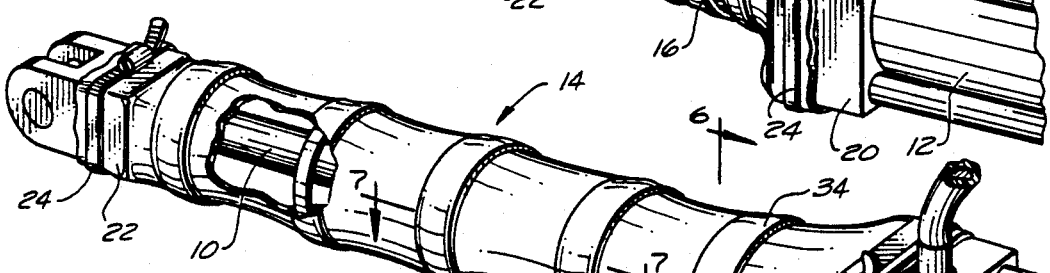
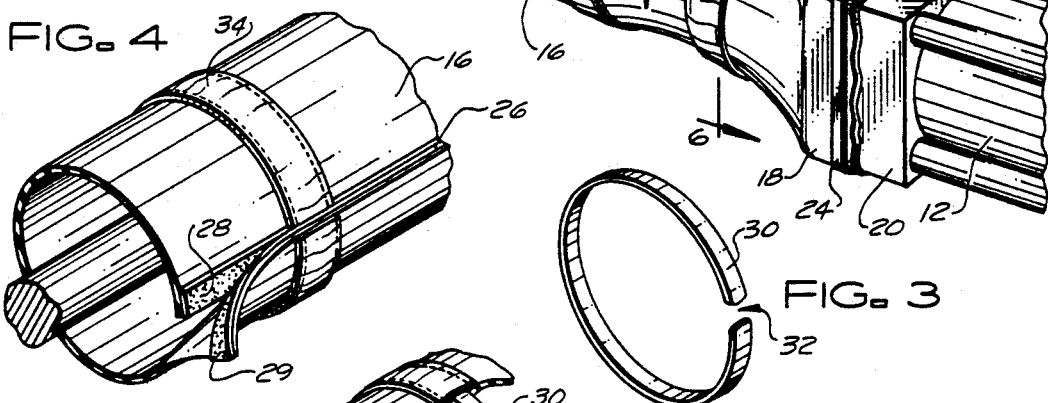
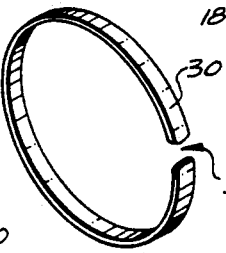
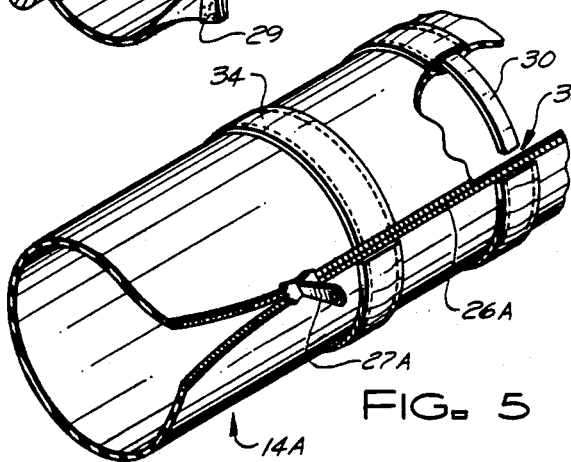
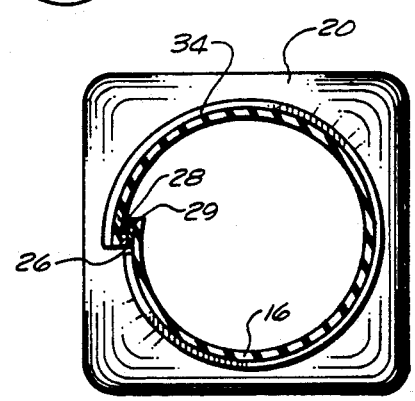
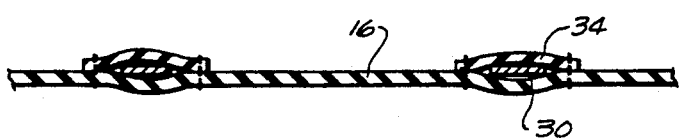

PROTECTIVE BOOT

This application is a continuation, of application Ser. No. 414,774 filed Sep. 25, 1989.

BACKGROUND OF THE INVENTION

1. Field of the Invention

This invention relates to the art of protective devices.

More particularly, this invention relates to a flexible protective boot for covering the surface of an axially extensible element.

In a further and more specific aspect, the instant invention concerns a protective cylinder boot including an elongate flexible sleeve and a plurality of flexible stays encircling the sleeve at spaced locations to prevent contact between the boot and the rod of the piston-cylinder assembly.

2. Description of the Prior Art

Hydraulic piston-cylinder assemblies are frequently used in environments where they are exposed to large amounts of dirt, dust, lint, sawdust, and other contaminants. If these contaminants are allowed to accumulate on the working surface of a piston rod, they can be drawn into the cylinder when the rod contracts. Once the contaminants are drawn into the cylinder, they mix with the lubricant stored in the cylinder, forming a sticky, viscous substance which impairs the sensitive controls and valves used to operate the assembly.

In order to prevent the aforementioned problem, various protective boots have been devised to prevent contaminants from settling on the rod of a piston-cylinder assembly. However, none of the previous boot designs have been entirely satisfactory, for a number of reasons. Some of the boots, for instance, have not been strong enough to withstand the repeated extensions and compressions and high internal pressures which the boot experiences as the rod it is mounted on reciprocates. Other boots have a tendency to lose their shape and to collapse about the rod. Still other boots have been difficult to install and remove from the piston-cylinder assembly. Other boots comprise bellows or accordion-like structures which require expensive molds.

It would be highly advantageous, therefore, to remedy the foregoing and other deficiencies inherent in the prior art.

Accordingly, it is an object of the present invention to provide an improved protective boot for a reciprocating element.

Another object of the invention is the provision of a flexible sleeve with means for removably securing one end of the sleeve to the head of a cylinder and the other end of the sleeve to the distal end of a rod disposed for reciprocation within the cylinder.

And another object of the invention is to provide a piston-cylinder boot with a plurality of stays for maintaining the shape of the boot and preventing contact between the boot and the actuating rod of the piston-cylinder assembly.

Still another object of the invention is the provision of a protective piston-cylinder boot having sufficient strength to withstand numerous compressions and extensions of the actuating rod.

Yet another object of the invention is to provide a piston-cylinder boot with a longitudinal slit for facilitating installation and removal of the boot.

Yet still another object of the invention is the provision of a piston-cylinder boot which is effectively sealed to prevent the ingress of dirt and other contaminants.

A further object of the invention is to provide a relatively smooth-walled boot devoid of preformed, permanent creases.

And still a further object of the invention is the provision of a protective boot, according to the foregoing, which is relatively inexpensive to tool and manufacture and comparatively simple and easy to use.

SUMMARY OF THE INVENTION

Briefly, to achieve the desired objects of the instant invention in accordance with the preferred embodiment thereof, an improved boot is provided for preventing contaminants from entering the cylinder of a piston cylinder assembly.

More specifically, the boot comprises an elongate flexible sleeve having a first end removably securable to the head of a cylinder and a second end removably securable to the distal end of a piston rod disposed for reciprocation within the cylinder. The boot is split along a longitudinal seam which can be closed by a zipper, a hook and loop type fastening strip, or other suitable attachment means. Several flexible metal or plastic stays encircle the sleeve at spaced locations to prevent the sleeve from contacting the piston rod. Each stay is split to accommodate the seam.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is a perspective view showing the protective boot of the present invention arranged on a piston-cylinder assembly in a retracted position.

FIG. 2 is a perspective view, similar to FIG. 1, showing the boot and piston-cylinder assembly in an extended position, with a portion of the boot broken away for illustrative purposes.

FIG. 3 is a perspective view of a flexible stay used in connection with the boot of the present invention.

FIG. 4 is a fragmentary perspective view showing an intermediate portion of the boot.

FIG. 5 is a view, similar to FIG. 5, according to an alternative embodiment of the invention.

FIG. 6 is a sectional view taken through line 6—6 of FIG. 2.

FIG. 7 is a sectional view taken through line 7—7 of FIG. 2.

DETAILED DESCRIPTION OF THE PREFERRED EMBODIMENTS

Turning now to the drawings in which like reference characters indicate corresponding elements throughout the several views, attention is first directed to FIGS. 1 and 2, which show a piston-cylinder assembly comprising an actuating rod 10 disposed for reciprocation within a hydraulic cylinder 12. A boot 14 forms a protective envelope around rod 10 to prevent contaminants from being drawn into cylinder 12.

Boot 14 comprises a flexible sleeve 16 fabricated of durable, waterproof, oil-resistant, and dust-impervious material such as vinyl. The sleeve 16 is substantially cylindrical and generally smooth when in its extended, or undistorted, configuration. No pre-formed, permanent, accordion-type pleats are present.

The sleeve 16 includes an enlarged first end 18 configured to fit over the enlarged main head 20 at the distal end of cylinder 12, and a smaller second end 22 configured to fit over the distal end of rod 10. The first and second ends 18 and 22 are removably secured to the cylinder head 20 and distal end of rod 10, respectively, by means of hose clamps 24 or any other conventional means.

The boot 14 is split along a longitudinal seam 26, as shown in FIG. 4, in order to allow its easy installation and removal from the piston-cylinder assembly. Cooperating elements of a continuously extending fastener, such as mating fabric hook and loop strips 28 and 29, are provided on opposite sides of the seam 26, in order to seal the boot and ensure that no dust or other contaminants enter through the seam. Alternative fastening means, such as a zipper assembly 27A, may be used to seal the longitudinal seam 26A of the boot 14A, as shown in FIG. 5.

Several flexible metal or plastic stays 30 encircle the sleeve 16 at spaced locations to preserve the substantially cylindrical shape of sleeve 16 and to prevent it for contacting the piston rod 10. Each of the stays 30 comprises an annular band which is split on one side, as shown at 32 in FIG. 3, to accommodate the seam 26. A strip of material 34, preferably similar to the material used in sleeve 16, is stitched or otherwise secured over each of the stays 30 to hold the stays in place.

The function of the boot 14 is best seen with reference to FIGS. 1 and 2. When the actuator rod 10 of the piston cylinder assembly is in its retracted position, as shown in FIG. 1, the portions of sleeve 16 between adjacent stays 30, compress to shorten the overall length of the sleeve, while the stays 30 prevent the sleeve from totally collapsing about rod 10. Then as the rod 10 moves outwardly to its fully extended position, as shown in FIG. 2, sleeve 16 expands to its full, undistorted length, thus completely protecting rod 10 and preventing the possibility of any contaminants being drawn into cylinder 12.

The boot 14 according to the present invention can be simply and inexpensively manufactured, since no expensive molds or molding procedures are required. This, taken in combination with the decreased equipment down time, reduced maintenance, and less frequent replacement costs which will result from the boot's protective function, will result in considerable savings to the user of hydraulic equipment.

Various modifications and variations to the embodiments herein chosen for purposes of illustration will readily occur to those skilled in the art. To the extent that such variations an modifications do not depart from the spirit of the invention, they are intended to be included within the scope thereof which is assessed only by a fair interpretation of the following claims.

What is claimed is:

1. A protective boot for use with equipment including:
    a guiding member having a distal end, and
    a guided member arranged for reciprocation within said guiding member, said guided member including a distal end and being movable from a retracted position in which the distal end of said guided member is proximate the distal end of said guiding member to an extended position is spaced a maximum distance away from said distal end for said guiding member,
    said protective boot comprising:
        a flexible sleeve formed of contaminant-impervious material, said sleeve being substantially cylindrical and generally smooth when undistorted and including a first end and a second end;
        first attachment means for securing the first end of said sleeve to the distal end of said guiding member;
        second attachment means for securing the second end of said sleeve to the distal end of said guided member; and
        at least one flexible stay secured to said sleeve intermediate said first and second ends of said sleeve for preventing intermediate portions of said sleeve from contacting said guided member.

2. The protective boot of claim 1, wherein said at least one flexible stay comprises an annular metal band.

3. The protective boot of claim 1, wherein said at least one flexible stay comprises an annular plastic band.

4. The protective boot of claim 1, wherein said spacer means comprises a plurality of flexible stays located at spaced locations along said sleeve.

5. The protective boot of claim 4, wherein each of said stays comprises an annular metal band.

6. The protective boot of claim 4, wherein each of said stays comprises an annular plastic band.

7. The protective boot of claim 1, wherein said sleeve is devoid of permanent pleats.

8. The protective boot of claim 1, wherein said first and second attachment means comprise clamp means for removably securing said first and second end to said guiding means and said guided means, respectively.

9. The protective boot of claim 1, further comprising slit means extending longitudinally from said first end of said sleeve to said second end for facilitating installation and removal of said boot from around said guided member.

10. The protective boot of claim 9, further comprising sealing means for disengageably sealing said slit means.

11. The protective boot of claim 10, wherein said sealing means comprises cooperating elements of a continuously extending fastener provided on opposite sides of said slit.

12. The protective boot of claim 11, wherein said cooperating elements of a continuously extending fastener comprise mating fabric hook and loop strips secured to opposite sides of said slit.

13. The protective boot of claim 11, wherein said cooperating elements of a continuously extending fastener comprise a zipper assembly.

14. A protective boot for use with equipment comprising:
    a hydraulic cylinder having an enlarged head formed at the distal end thereof, and
    a piston mounted for reciprocation within said cylinder, said piston including an actuator rod and being movable from a retracted position in which the distal end of the actuator rod is proximate the enlarged head of the cylinder to an extended position in which the distal end of the actuator rod is spaced a maximum distance away from said enlarged head;
    said protective boot comprising;
        a flexible sleeve formed of contaminant-impervious material, said sleeve being substantially cylindrical and generally smooth when undistorted and including an enlarged first end dimensioned to fit over said enlarged head of sad cylinder and a smaller second end dimensioned to fit over the end of said actuator rod;

a sealable slit means extending longitudinally from said first end of said sleeve to said second end for facilitating installation and removal of said sleeve from around said actuating rod;

first attachment means for removably securing the first end of said sleeve to said enlarged head of said cylinder;

second attachment means for removably securing the second end of said sleeve to the distal end of said guided member; and at least one flexible annular stay, split to accommodate said slit means, secured to said sleeve intermediate said first and second ends of said sleeve for preventing intermediate portions of said sleeve from contacting said guided member.

* * * * *